United States Patent
Kawahata

(10) Patent No.: US 7,019,901 B2
(45) Date of Patent: Mar. 28, 2006

(54) WAVELENGTH PERIODICAL FILTER

(75) Inventor: Yuichi Kawahata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 237 days.

(21) Appl. No.: 10/120,504

(22) Filed: Apr. 12, 2002

(65) Prior Publication Data
US 2003/0133192 A1    Jul. 17, 2003

(30) Foreign Application Priority Data
Jan. 16, 2002    (JP) .............................. 2002-006825

(51) Int. Cl.
*G02B 27/28*    (2006.01)
*G02B 5/30*    (2006.01)
(52) U.S. Cl. ..................... 359/487; 359/494; 356/453
(58) Field of Classification Search ................ 359/494, 359/495, 497, 498, 487, 578, 579, 483, 500, 359/577; 385/24, 31; 356/519, 453, 469; 398/65
See application file for complete search history.

(56) References Cited

U.S. PATENT DOCUMENTS

| 6,130,971 A | 10/2000 | Cao | 385/31 |
| 6,160,932 A | 12/2000 | Huang et al. | 385/24 |
| 6,205,270 B1* | 3/2001 | Cao | 385/24 |
| 6,560,015 B1* | 5/2003 | Cao | 359/487 |
| 6,590,707 B1* | 7/2003 | Weber | 359/498 |

FOREIGN PATENT DOCUMENTS

| JP | 7-23205 | 4/1995 |
| JP | 7-32506 | 6/1995 |
| JP | 11-202125 | 7/1999 |

OTHER PUBLICATIONS

Japanese Abstract, 7-23205, Apr. 25, 1995.
Japanese Abstract 7-32506, Jun. 15, 1995.
Japanese Abstract 11-202125, Jun. 30, 1999.

* cited by examiner

*Primary Examiner*—Audrey Chang
(74) *Attorney, Agent, or Firm*—Staas & Halsey LLP

(57) ABSTRACT

Input light is split by a PBS into orthogonal polarized waves. One of the polarized waves is reflected by a mirror HR, and input to a $7\lambda/8$ plate. The other is phase-controlled by a phase controller, and input to the $7\lambda/8$ plate. The respective light beams to which a phase bias is applied by the $7\lambda/8$ plate are input from a 2R mirror having reflectances that differ depending on a polarized wave to a GT resonator. The light beams output from the GT resonator again pass through the $7\lambda/8$ plate, inversely travel the original optical path, and enter the PBS. Then, the light beams are output from an output 1 or 2 depending on a polarized wave.

10 Claims, 13 Drawing Sheets

1561.42nm 1553.329nm 1545.323nm 1537.61nm 1529.55nm

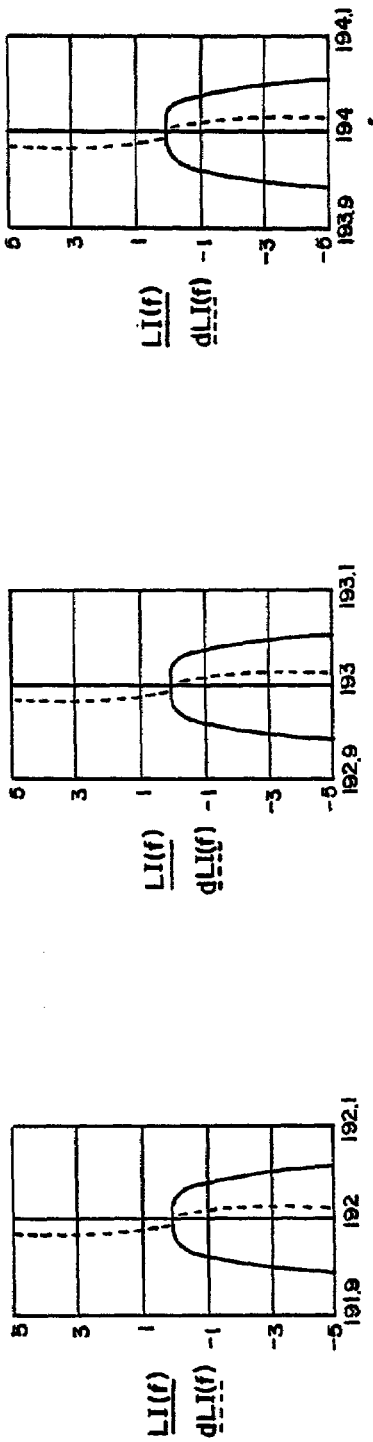
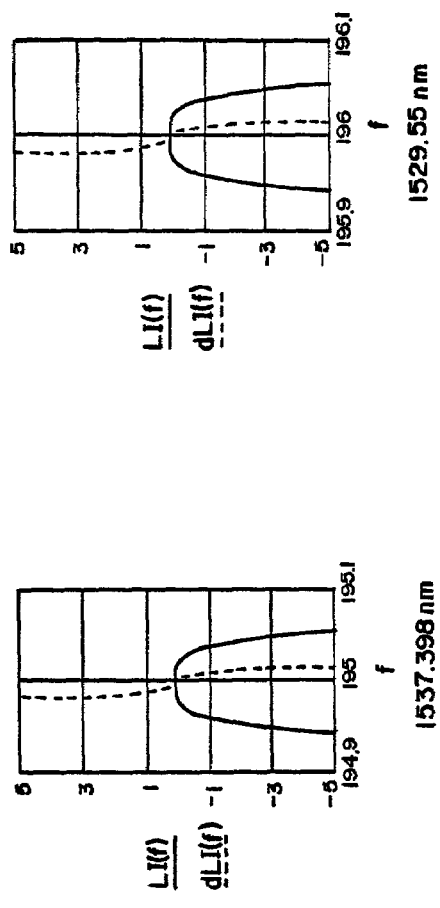
FIG. 5A PRIOR ART 1561.42 nm
FIG. 5B PRIOR ART 1553.329 nm
FIG. 5C PRIOR ART 1545.323 nm
FIG. 5D PRIOR ART 1537.398 nm
FIG. 5E PRIOR ART 1529.55 nm

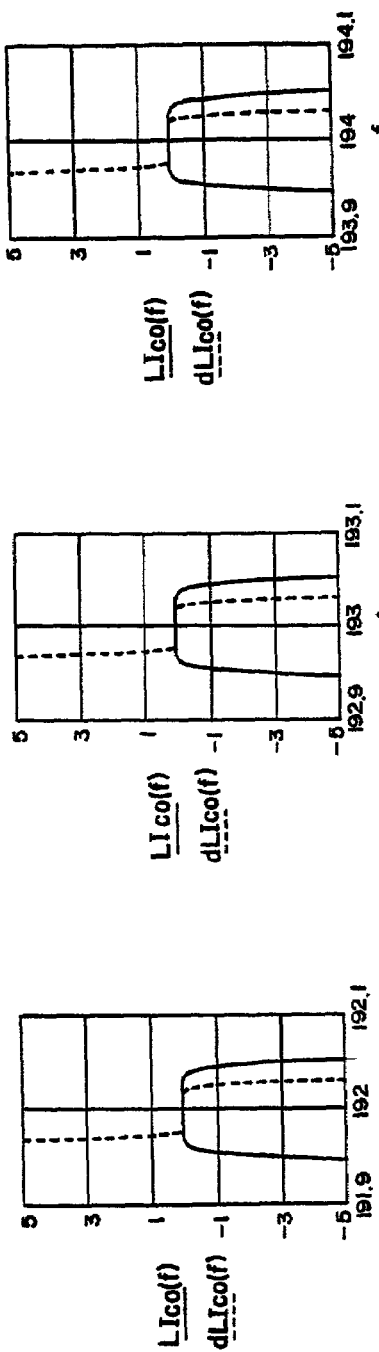
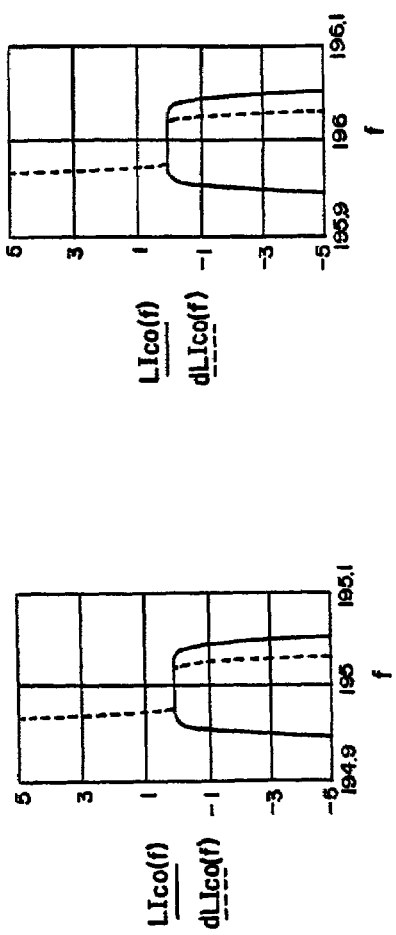
FIG.12A 1561.42nm
FIG.12B 1553.329nm
FIG.12C 1545.323nm
FIG.12D 1537.398nm
FIG.12E 1529.55nm

WAVELENGTH PERIODICAL FILTER

BACKGROUND OF THE INVENTION

1. Field of the Invention

The present invention relates to an optical filter, and more particularly, to a wavelength periodical filter whose wavelength transmission characteristic has periodicity.

2. Description of the Related Art

In a wavelength division multiplexing (WDM) transmission, which is currently a leading optical communication system, a function for freely adding/dropping a certain wavelength signal in part, namely, an optical coupler/splitter plays an important role. Since restrictions are imposed on the amplification band of an optical amplifier used in a WDM transmission, there is a demand for transmitting and processing as many transmission signals as possible in an available wavelength band. At this time, the number of wavelengths and a signal wavelength interval are inversely proportional. Therefore, the valid wavelength band of each channel is narrowed unlimitedly. Accordingly, the transmission characteristic of each channel must be optimized to suppress the influences of the fluctuations of a laser, a temperature change, etc. to a minimum.

For example, a periodical filter is used as a converter for converting, for example, a signal of 100-GHZ frequency spacing to a signal of 200-GHz spacing, or further to a signal of 400-GHz spacing. Periodical filters under research and development at present include modules such as BICS (U.S. Pat. No. 6,130,971) by Avanex Corp. of the U.S., WaveXpander (U.S. Pat. No. 6,160,932) by WaveSplitter Technologies, Inc. of the U.S., Slicer by Chroum Technologies, Inc. of the U.S., Interleaver by JDS-Uniphase Corp. of the U.S., and MGTI (Michelson-Gires-Tournois Interferometer) by Communications Research Laboratory of the Ministry of Post and Telecommunications of Japan. Since these modules trade off an optimization band against a loss, restrictions are imposed on system designs.

Among these modules, modules which have a little insertion loss and a relatively wide optimization band in principle are the BICS by Avanex Corp., and the double GTR (Gires-Tournois Resonator) by the Ministry of Posts and Telecommunications.

Both of the MGTI and the BICS are configured by combining a Michelson interferometer and a GTI (Gires-Tournois Interferometer or a GTR). Such configurations have the most distinguished characteristic of essentially having a band whose transmission characteristic is optimized, because a phase characteristic has an optimization band. The former is configured by attaching a GTR to the tip of an arm of the Michelson interferometer. In this configuration, a GTR is attached to one arm, or both arms.

FIG. 1 shows the configuration of a periodical filter that is configured by attaching GTRs to both arms of a Michelson interferometer.

The configuration, in which the GTRs are attached to both of the arms (this is called a double GTR), has an advantage that an optimization band can be widened to 1.6 times (0.64 nm) in comparison with the configuration where a GTR is attached to one arm (an optimization band is approximately 0.4 nm), by changing the reflectances of the GTRs. However, the lengths of the arms of this interferometer are different, and the interferometer is designed to include as parameters not only the gap between mirrors within a GTR, but also a difference between optical path lengths. Therefore, the lengths of the arms must be controlled with precision of several μs.

Each of these GTRs is configured by a semi-transparent mirror Ma, a 3λ/4 plate, and a total reflection mirror. The semi-transparent mirror Ma and the total reflection mirror are the same as interference filters configuring a normal etalon, and their reflection planes do not have polarization dependence.

FIG. 2 shows the configuration of a BICS.

Since the BICS is designed not to have the difference between optical path lengths, only the gap between mirrors within a GTR may be accurately controlled, which implements the ease of operability.

FIGS. 3A to 3E, and 4 show simulation results of the transmission characteristic of the double GTR.

As shown in FIGS. 3A to 3E, the transmission characteristic of each frequency (channel) is represented by a solid line, and the inclination of the transmission characteristic is represented by a dotted line in the case where the double GTR has different GTR reflectances (8% and 57.2%). These figures show the transmission characteristic in the case where central wavelengths are respectively 1561.42 nm (FIG. 3A), 1553.29 nm (FIG. 3B), 1545.323 nm (FIG. 3C), 1537.61 nm (FIG. 3D), and 1529.55 nm (FIG. 3E). An optimization band is approximate 0.64 nm in all the cases. Furthermore, FIG. 4 shows the periodical transmission characteristic (indicated by a solid line) in a predetermined frequency range. In this case, isolation is approximately 30 dB or more.

FIGS. 5A to 5E, and 6 show the simulation results of the transmission characteristic of the BICS.

FIGS. 5A to 5E show the transmission characteristic of the BICS at respective frequencies in the case where central wavelengths are respectively 1561.42 nm, 1553.29 nm, 1545.323 nm, 1537.398 nm, and 1529.55 nm, and a GTR reflectance is 17.5%. A solid line indicates the transmission characteristic, whereas a dotted line indicates the inclination of the transmission characteristic. Here, an optimization band is approximately 0.16 nm.

FIG. 6 shows the periodical transmission characteristic of the BICS in a predetermined band. In this case, the isolation of the BICS is approximately 43 dB or more.

A vertical axis in FIGS. 3A to 6 indicates dB, whereas a horizontal axis indicates THz.

Expecting that a WDM communication will be become denser in the future, the wavelength optimization band of the BICS must be significantly widened.

SUMMARY OF THE INVENTION

An object of the present invention is to provide a wavelength periodical filter whose wavelength optimization band is widened.

A wavelength periodical filter according to the present invention comprises: a splitting unit splitting input light into different polarized waves; a phase bias unit having an optical axis inclined 45 degrees toward the polarized waves of the input light; and a GT resonating unit. The GT resonating unit comprises: a semi-transparent mirror unit having reflectances which are different for polarized waves that are inclined +45 and −45 degrees toward the optical axis of the phase bias unit, reflecting part of light, and making part of the light pass through; a total reflection mirror unit reflecting input light 100%; and a polarized wave rotating unit, which is arranged between the semi-transparent mirror unit and the total reflection mirror unit, multiple-reflecting the polarized waves of the light between the semi-transparent mirror unit and the total reflection mirror unit while rotating the polarized waves 90 degrees each time the polarized waves shuttle between the semi-transparent mirror unit and the total reflection mirror unit. The wavelength periodical filter outputs input light from the GT resonating unit, makes the light inversely travel on the path, and outputs the light from the splitting unit.

According to the present invention, interference of light beams can be delicately controlled, and a wavelength passband characteristic can be flattened or shaped like a box, so that optimization can be easily and stably made.

BRIEF DESCRIPTION OF THE DRAWINGS

FIGS. 5A to 5E show the simulation results of the transmission characteristic of the BICS (No. 1);

FIGS. 12A to 12E show the simulation results of a periodical filter according to the preferred embodiment (No. 1)

DESCRIPTION OF THE PREFERRED EMBODIMENTS

Figure 1:
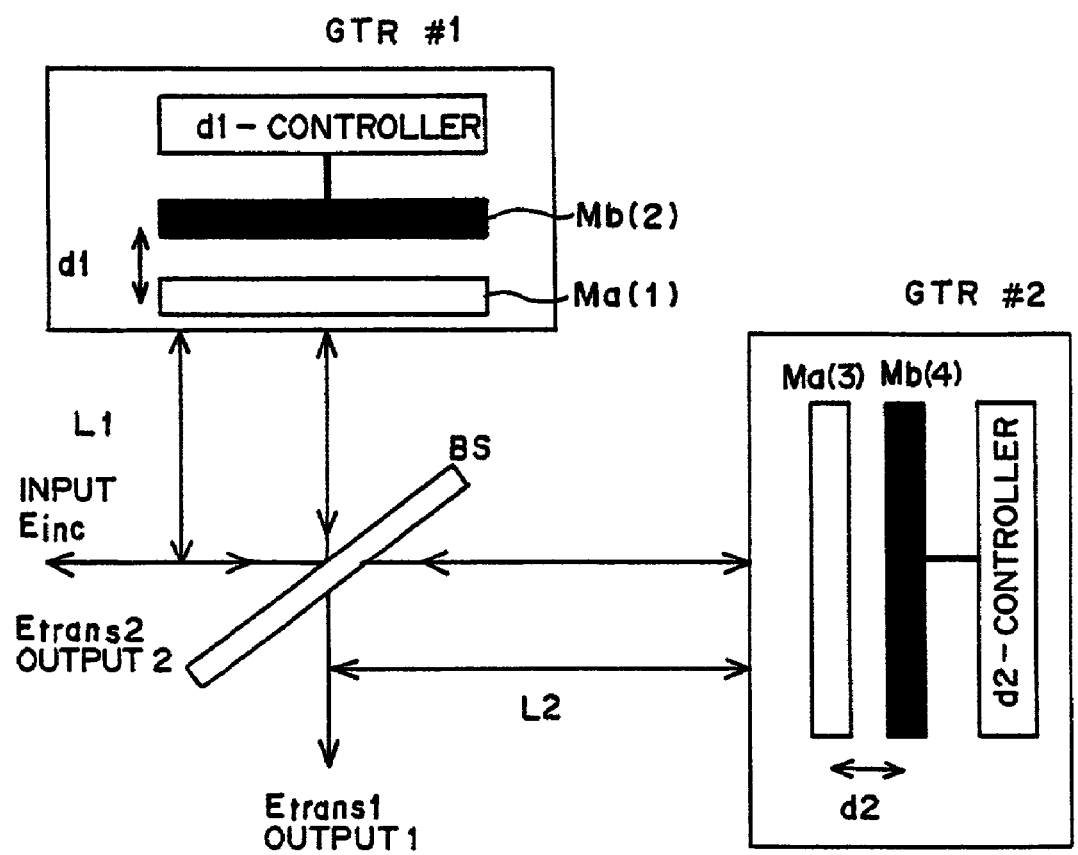
FIG. 1 shows the configuration of a periodical filter where GTRs are attached to both arms of a Michelson interferometer.
Figure 2:
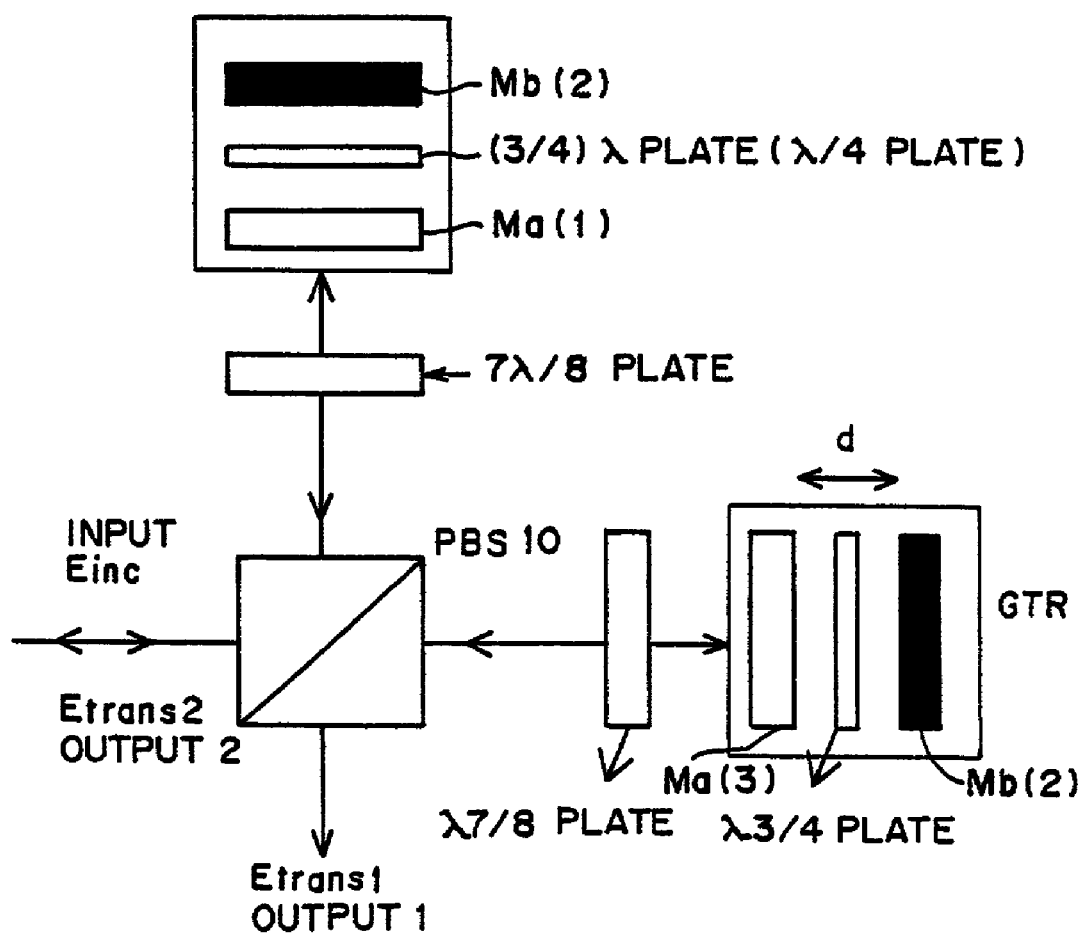
FIG. 2 shows the configuration of a BICS.
Figure 3A:
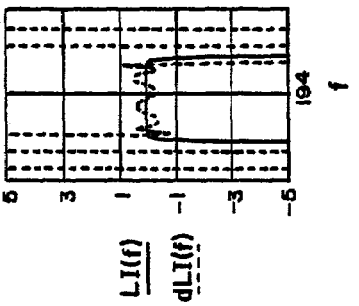
FIGS. 3A to 3E show the simulation results of the transmission characteristic of a double GTR (No. 1)
Figure 3B:
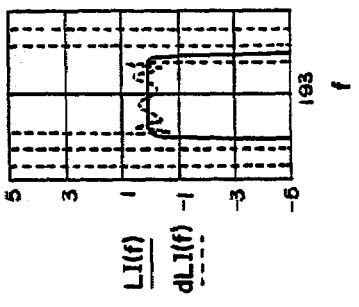
Figure 3C:
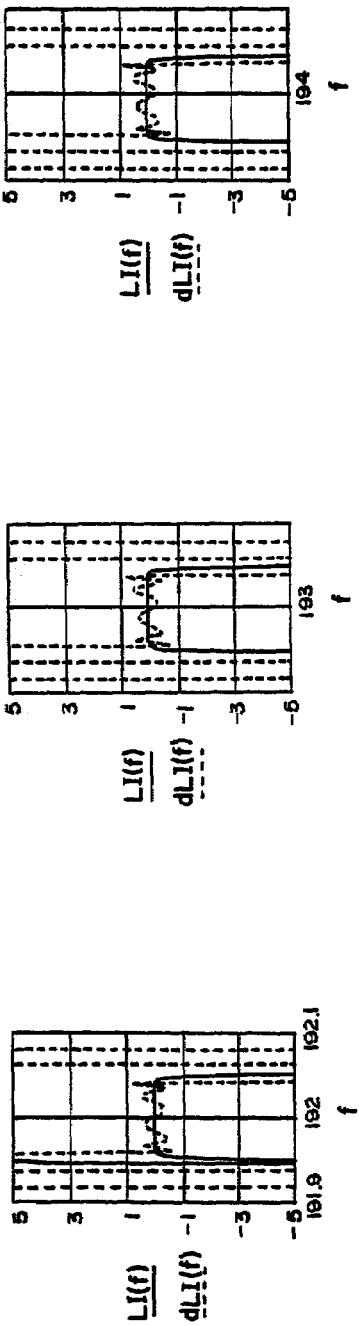
Figure 3D:
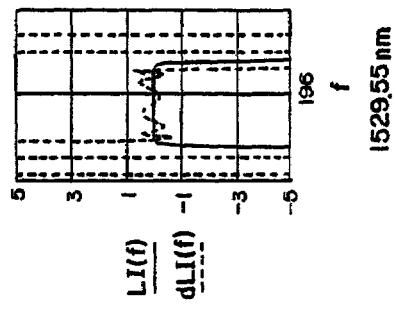
Figure 3E:
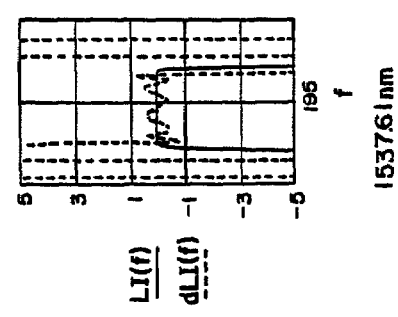
Figure 4:
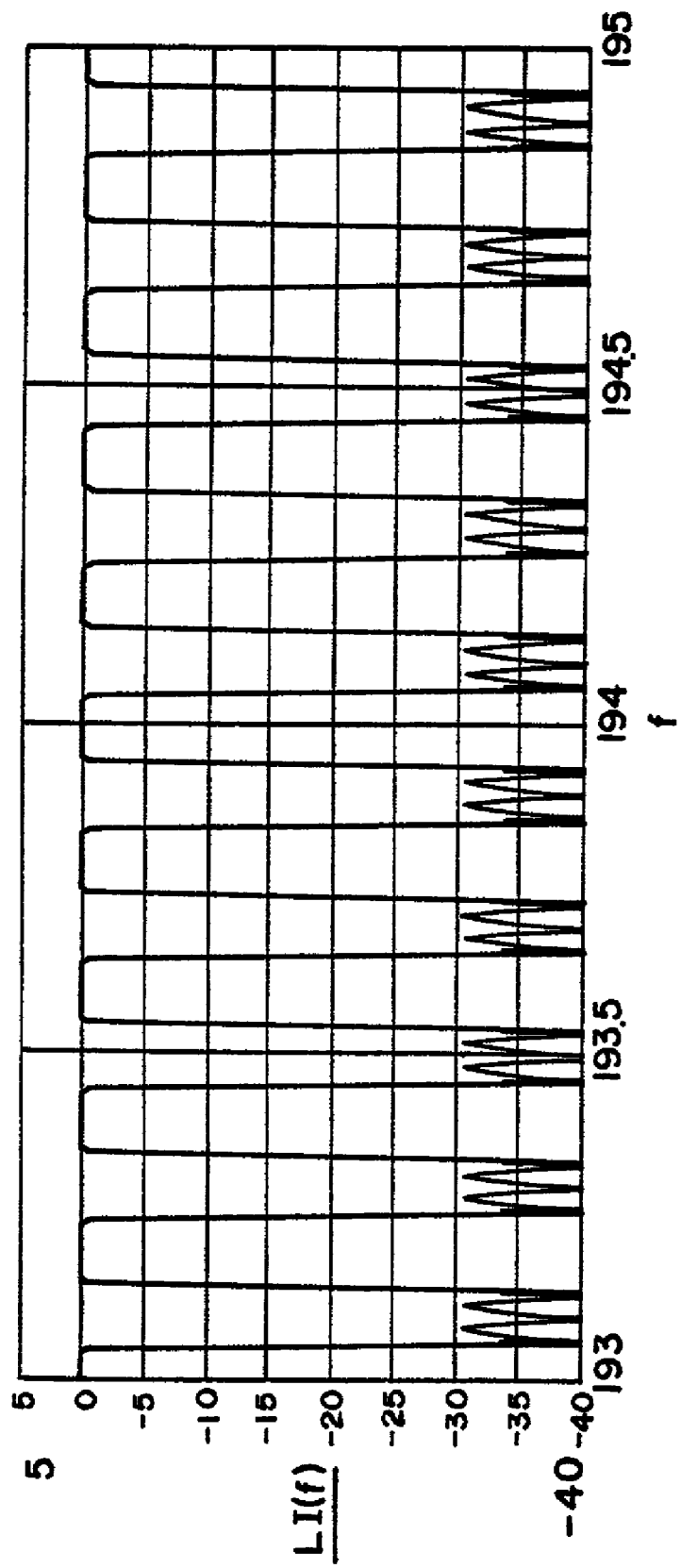
FIG. 4 shows the simulation result of the transmission characteristic of the double GTR (No. 2)
Figure 6:
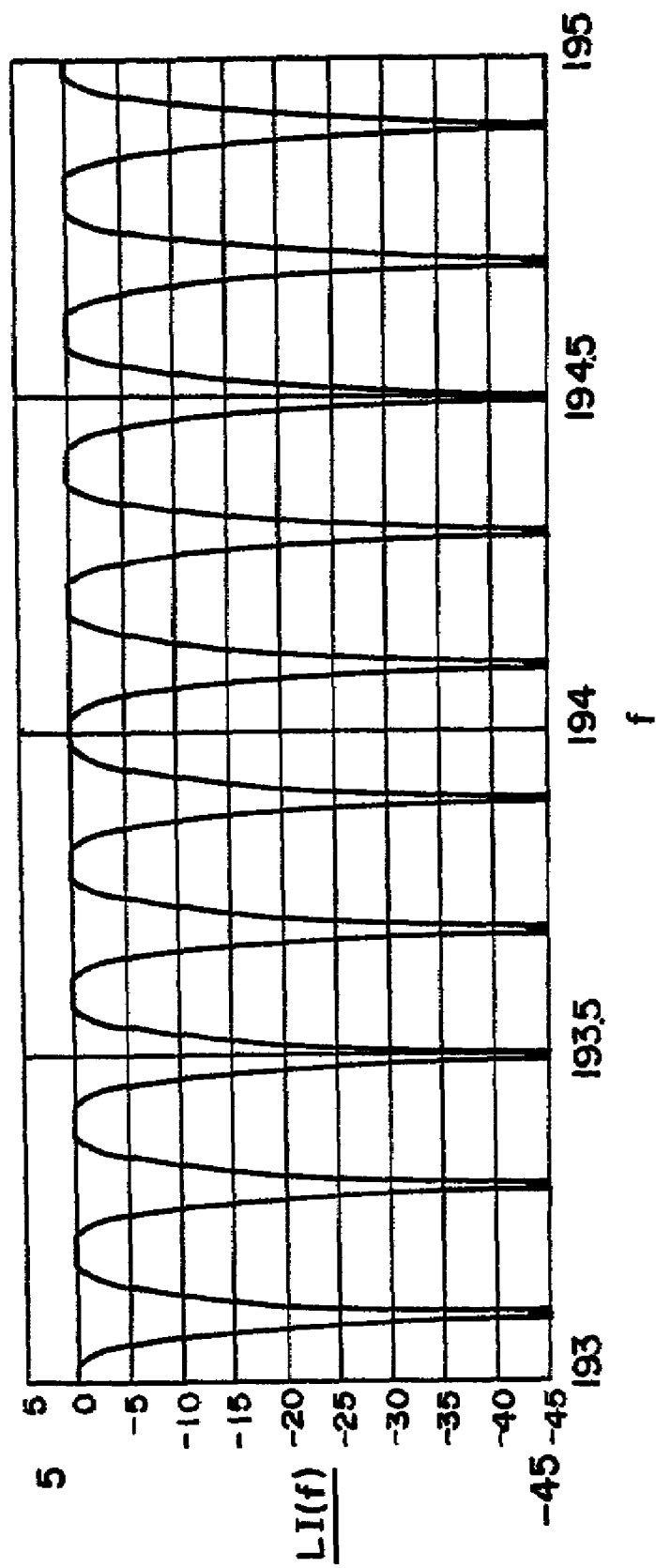
FIG. 6 shows the simulation result of the transmission characteristic of the BICS (No. 2)
Figure 7:
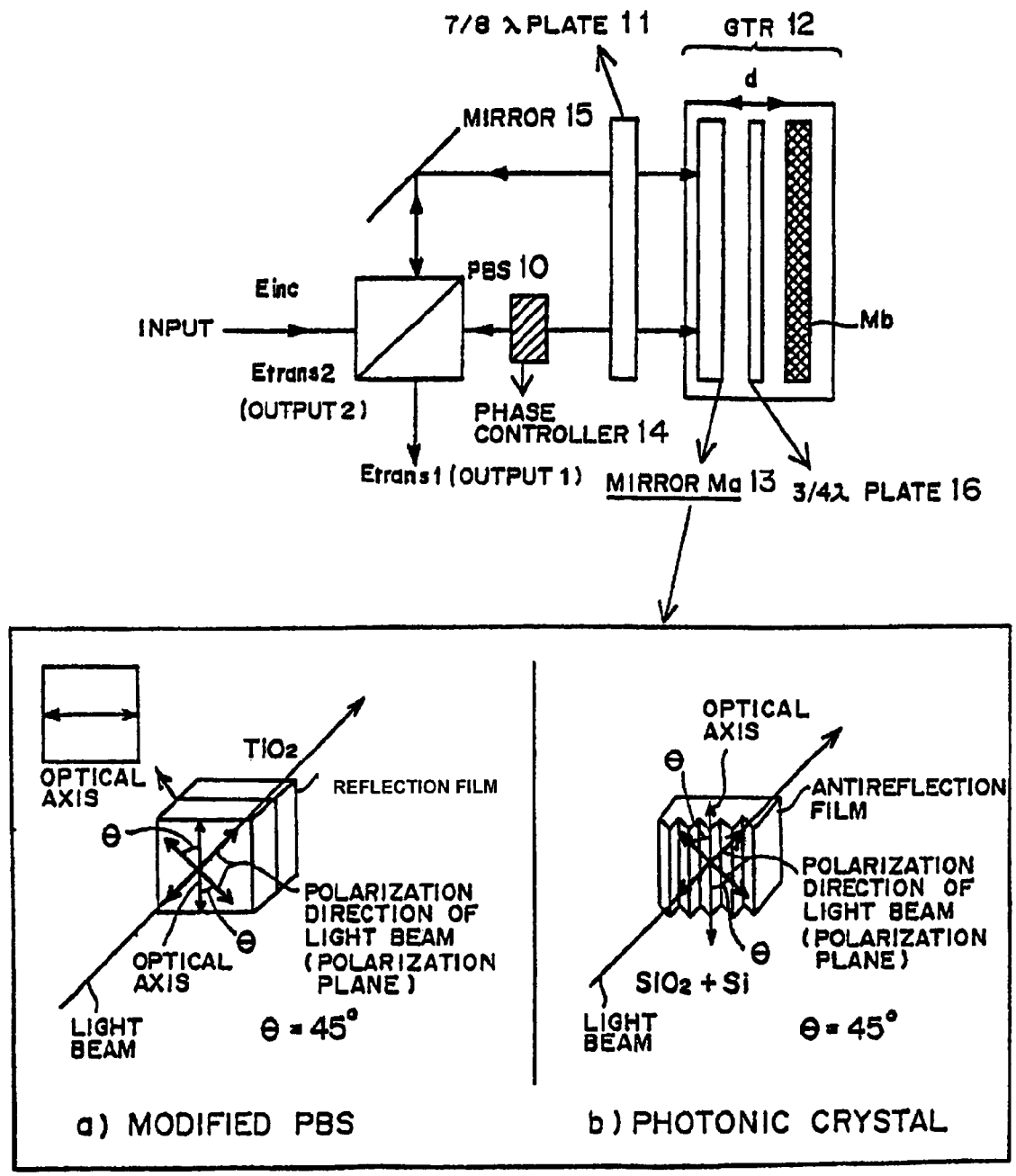
FIG. 7 exemplifies the configuration of a preferred embodiment according to the present invention.

FIG. 7 exemplifies the configuration of a preferred embodiment according to the present invention.

In a current BICS, input light is first split by a PBS (Polarization Beam Splitter) 10, and the split light beams proceed along two arms. The light beams split by the PBS 10 pass through a 7λ/8 plate 11, so that two polarized wave components are generated. The respective components are multiple-reflected by a GTR (GT Resonator) 12, and return to the PBS 10. Since an output port varies depending on a wavelength at this time, even-and odd-numbered channels can be extracted separately.

In the periodical filter according to this preferred embodiment, a birefringent crystal 13 is inserted after the 7λA/8 plate 11 being a phase bias unit of the above described BICS, and the polarized wave components are split into 4. The polarized wave components are collected into groups each composed of 2 orthogonal components, and the respective groups are multiple-reflected by the GTR 12 with different reflectances. The light beams that return to the PBS 10 at this time are lights in which the polarized wave components of the respective two groups interfere with each other.

This preferred embodiment is characterized in that the number of polarized wave components is further increased by 2, and multiple-reflection is caused with reflectances different from a reflectance of two conventional polarized wave components. As a result, the wavelength characteristic of light output from each port can be widened to approximately 3 times (≈0.48 nm) the conventional characteristic (≈0.16 nm). Therefore, this periodical filter can play an important role in a future high-density wavelength multiplexing communication with frequency spacing of 50 THz or lower.

An example of the configuration of the periodical filter according to this preferred embodiment is shown in FIG. 7.

A modified PBS configured by combining 2 birefringent crystals to make optical axes orthogonal is used as one of reflection films Ma 13 within the GTR 12, so that a phase difference occurs in each of two polarized beams, which are split by the PBS 10, in the 7λ/8 plate 11 (equivalent to a λ/8 plate).

This modified PBS collects 2 orthogonal polarized wave components into one group, and provides different reflectances to respective polarized wave groups.

The modified PBS is configured by sticking 2 plates composed of $T_iO_2$ crystals to make the optical axes orthogonal. These crystals have refractive indexes of 1.576 and 5.667 respectively for ordinary and extraordinary beams. Or, a method using a photonic crystal instead of the modified PBS may be considered. With the photonic crystal, the nature that a transmittance is varied depending on a polarized wave is used. With the photonic crystal, a big refractive index difference as with the modified PBS can be implemented by optimizing a design parameter. Such a design parameter of the photonic crystal can be found by calculating a wavelength transmission characteristic, for example, with an FDTD method, a Pendry method, etc.

Here, as the mirror Ma 13, an element that outputs orthogonal polarized waves in the same direction, and obtains different reflectances by changing a refractive index depending on a polarized wave may be available. A variety of specific configuration methods can be considered by a person having ordinary skill in the art. With such methods, light that is split into polarized waves by the PBS 10 is further made into polarized beams which are orthogonal and have a phase difference. As a result, different reflectances are implemented for the respective polarized light components within the GTR, so that an interference characteristic, which is more complex than that obtained using a conventional mirror without polarization dependence, can be implemented with reflectances different for the polarized beams that are multiple-reflected within the GTR.

a) of FIG. 7 exemplifies the modified PBS, which is configured by sticking two birefringent crystals whose optical axes are directed orthogonally. The birefringent crystals are configured, for example, by $T_iO_2$ The front surface on which a light beam is input is an antireflection film AR surface, but reflection film HR is arranged on the surface (the rear surface) to which a light beam is reflected.

b) of FIG. 7 exemplifies the use of a photonic crystal, which is formed by a plurality of crystal peaks like slits on the surface of a crystal composed of $S_iO_2$ and $S_i$. The height and the interval of the peaks are on the order of the wavelength of light. Although the peaks are exaggerated for illustration in b) of FIG. 7, they are very small actually. For the photonic crystal, an antireflection film AR is arranged on the surface to which a light beam is pass through.

In summary, a polarized wave component of light, which is split by the PBS 10 and enters one arm, passes through the 7λ/8 plate 11, so that phase biasing for adding a phase difference to an orthogonal polarized wave is made. This light passes through the modified PBS, and a different reflectance is provided to each polarized wave component. Considering that two orthogonal components are one group, the two components of each group interfere with each other within the GTR 12. Then, these components pass through the Ma 13 (a crystal having a different refractive index, that is, a reflectance depending on a polarized wave), the 7λ/8 plate 11, and interfere with the components of the other group, whereby a widened transmission characteristic in an optimization band can be implemented.

Propagation paths of light shown in FIG. 7 are explained. Firstly, light enters the PBS 10 from an input. At the PBS 10, orthogonal polarized waves are split and output in different directions. A phase controller 14 to be described later is placed on the propagation path of one of the polarized waves. The phase controller 14 can be configured, for example, by applying a voltage to lithium niobate. The phase control is performed so that polarized beams are controlled to interfere with each other when the beams split by the PBS 10 reflect and return. The polarized beam for which the phase control is not performed is directed to the GTR 12 by a mirror 15. A phase bias is applied by the 7λ/8 plate to the different orthogonal polarized waves, namely, the polarized wave for which the phase control is performed, and the polarized wave for which the phase control is not performed. Here, the optical axis of the 7λ/8 plate 11 are assumed to be inclined 45 degrees toward the polarized waves of input light. Then, the polarized waves are input to the GTR 12 according to this preferred embodiment (the configuration of the GTR according to this preferred embodiment is different from a conventional GTR, but also called a GTR since its fundamental operations are the same). The polarized waves input to the GTR 12 pass through the double reflect (2R) mirror Ma. The 2R mirror Ma 13 has a reflectance of 40% or more, which is different depending on a polarized wave, and an optical axis inclined 45 degrees toward the optical axis of the 7λ/8 plate 11. It is desirable that one of reflectances of the 2R mirror Ma 13 is 10% or less, and the other is 40% or more. Especially, it is desirable that the low reflectance is 5(±1)%, and the high reflectance is 49(±1)%. Accordingly, the 2R mirror Ma 13 divides a polarized beam into polarized waves in the directions of +45 degrees and −45 degrees, makes a polarized wave to pass through, and reflects a polarized wave with a different reflectance.

Specifically, the 2R mirror Ma 13 is a birefringent crystal having an optical axis inclined 45 degrees toward the optical axis of the 7λ/8 plate 11, or a three-dimensional photonic crystal designed to add a difference of 40% or more to a polarized wave having a different reflectance. Furthermore, the above described PBS 10 may be a beam splitter, and the whole of the PBS 10 is configured as a Michelson interferometer. Additionally, a birefringent crystal having an optical axis inclined 45 degrees toward the polarized wave of input light, and a birefringent crystal having an optical axis inclined −45 degrees toward an input light beam can be combined and used as the 2R mirror 13.

Then, the polarized waves pass through a 3λ/4 plate (equivalent to a λ/4 plate) 16, are reflected by a total reflection mirror Mb 17, and again pass through the 3λ/4 plate 16. At this time, the light beams pass through the 3λ/4 plate 16 to and fro. Since the polarized waves pass through the 3λ/4 plate 16 twice, they are rotated 90 degrees, and enter the 2R mirror Ma 13. Here, the 3λ/4 plate (λ/4 plate) is adopted. However, an element which rotates a polarized wave 90 degrees during the shuttle of the wave to and from the mirror Mb may be adopted. Also a Faraday rotator is usable.

The 2R mirror Ma 13 makes part of light pass through, and reflects part of the light with a reflectance different depending on a polarized wave. The passed light beam further passes through the 7/8λ plate 11, and inversely travels the path. At this time, the light beam is multiple-reflected by the GTR 12, and output while its polarized wave is rotated 90 degrees at the time of each reflection. Therefore, polarized waves of the same type, which are output from the GTR 12, interfere with each other, and intensified and weakened light beams are generated. These light beams again enter the PBS 10, and are output to an output 1 or 2 depending on the state of a polarized wave. To which direction a light beam having which wavelength is output is determined according to the length "Id" of the GTR 12, and the number of reflections (namely, how many times a polarized wave is rotated 90 degrees) of a polarized wave before being input to the PBS 10.

FIGS. 8 to 11 conceptually explain how light is controlled by the GTR according to this preferred embodiment.

Figure 8:
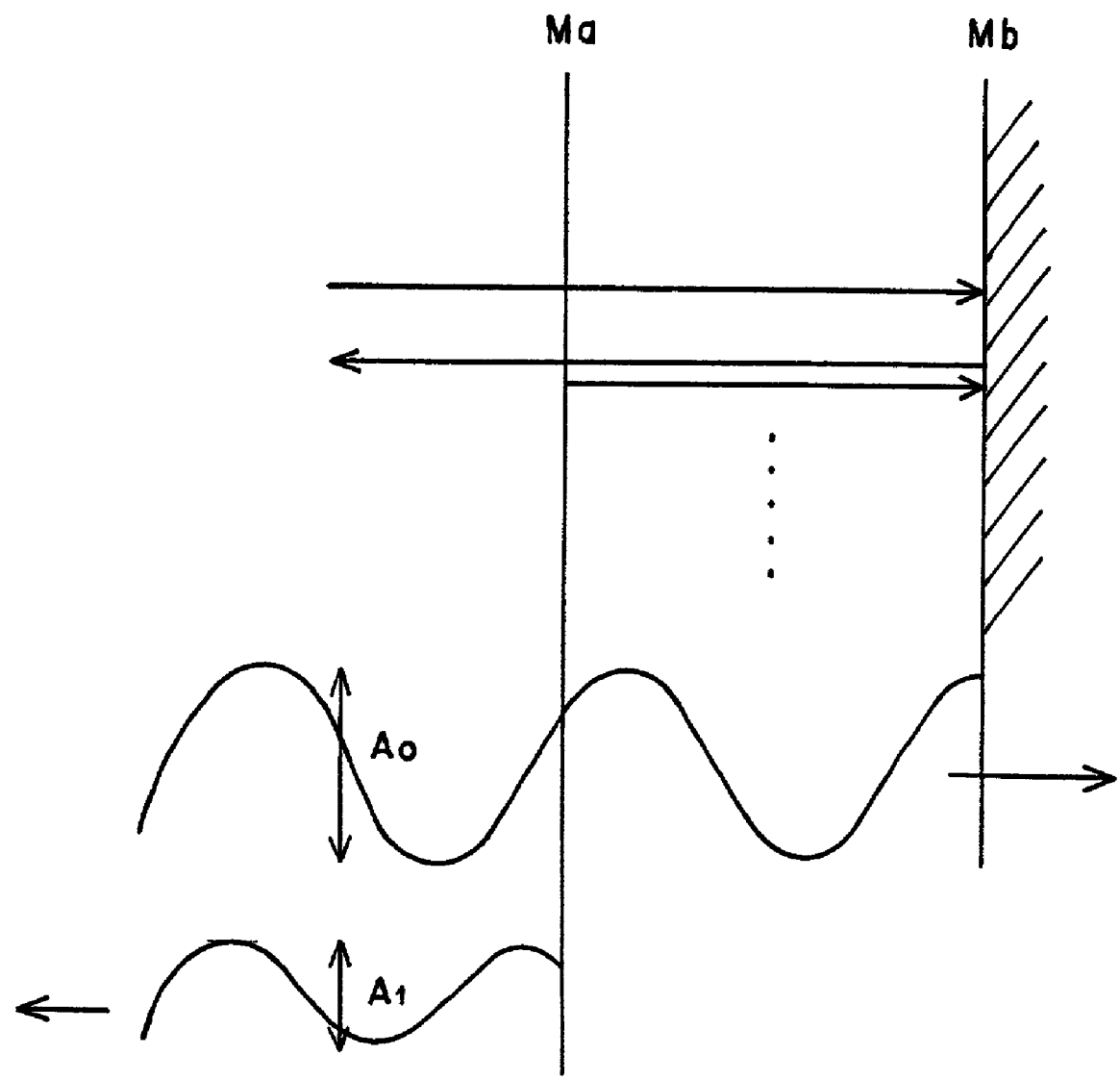
FIG. 8 conceptually explains how light is controlled by a GTR according to the preferred embodiment (No. 1)

FIG. 8 shows only the semi-transparent mirror Ma and the total reflection mirror Mb, which are fundamental constituent elements of the GTR. This configuration is fundamentally the configuration of a Fabry-Perot resonator, although the reflectances of the mirrors are different. The passband of a Fabry-Perot resonator exhibits a very acute peak centering around a particular wavelength. It is assumed that peaks become flatter as explanation proceeds from FIGS. 8 to 11.

In FIG. 8, input light is reflected by the total reflection mirror Mb. Part of the light is made to pass through or reflect by the semi-transparent mirror Ma. At this time, the amplitude of light that is made to pass through or reflect differs depending on a reflectance. Namely, the passband of a Fabry-Perot resonator is formed by the interference of light which repeats reflection and pass. Therefore, the amplitude of light that causes interference can be varied by changing a reflectance (the amplitude of $A_1$ is smaller than that of $A_0$). If the semi-transparent mirror Ma is a total reflection mirror, a light beam the amplitude of which is not attenuated is multiple-reflected between the two mirrors. As a result, canceling or intensification of light beams, which is caused by the interference of light beams, strongly occurs, so that a wavelength characteristic having an acute peak is obtained.

However, if the mirror is implemented as a semi-transparent mirror, part of light is made to pass through, and part of the light is reflected. Therefore, the amplitude of light is reduced, and the manner in which passed light beams interfere with each other varies. Even light beams having wavelengths that shift from the center of the passband do not strongly cancel each other out. Accordingly, the passband can be slightly flattened by adjusting the reflectance of the mirror Ma.

Figure 9:
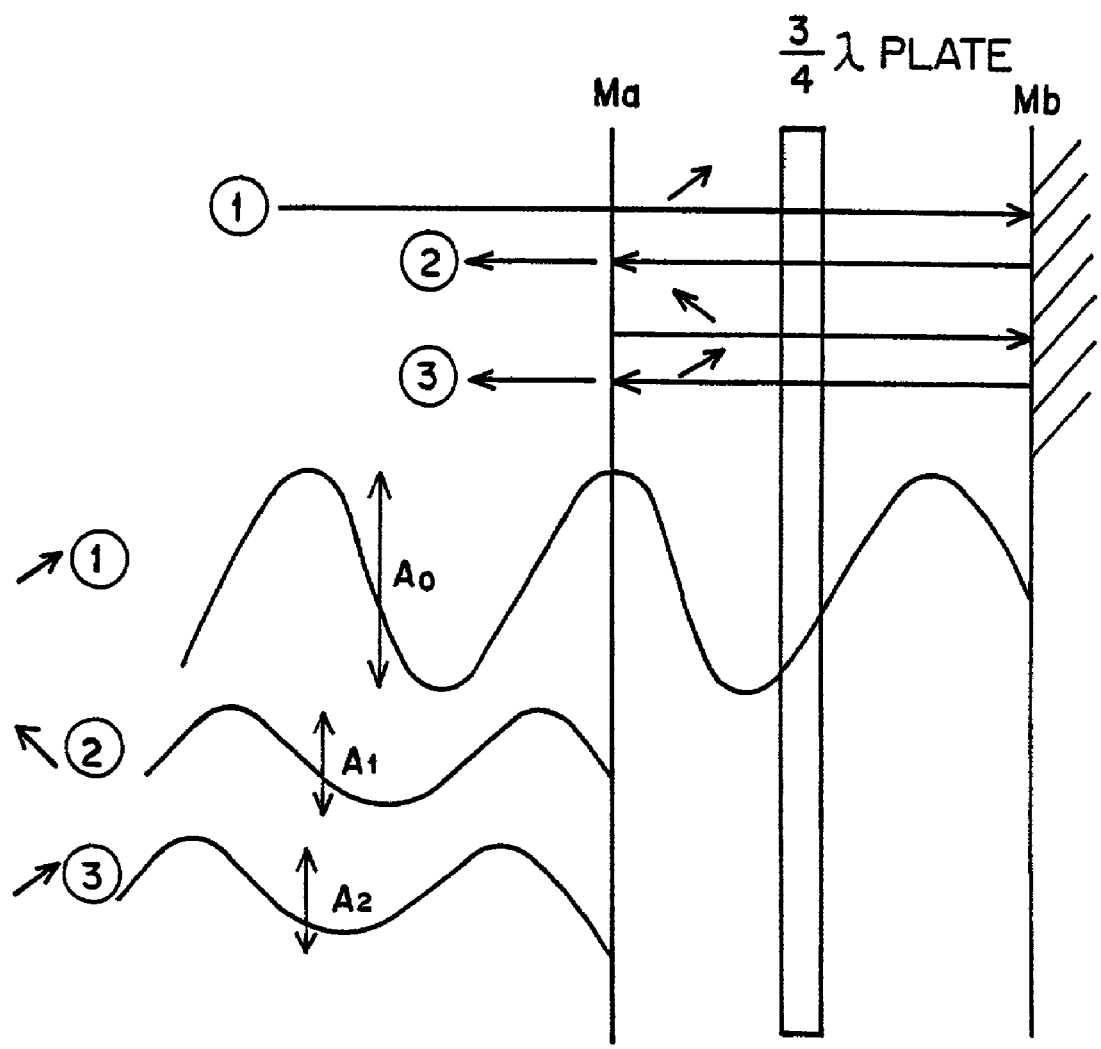
FIG. 9 conceptually explains how light is controlled by the GTR according to the preferred embodiment (No. 2)

Next, a 3λ/4 plate is inserted between the mirrors Ma and Mb as shown in FIG. 9. Then, as described above, a polarized wave is rotated by the number of shuttle times that the wave passes through the 3λ/4 plate. Accordingly, the polarized wave of a light beam ③ which is output after passing through the 3λ/4 plate by an even number of shuttle times, and that of a light beam ② which is output after passing through the 3λ/4 plate by an odd number of shuttle times become orthogonal. Therefore, they do not interfere with each other. Furthermore, the amplitude $A_1$ of a light beam which passes through the 3λ/4 plate once is smaller than the amplitude $A_0$ of the input light, and the amplitude $A_2$ of a light beam which passes through the 3λ/4 plate is twice smaller than the amplitude $A_1$. Besides, since the light beams that respectively pass through the 3λ/4 plate by even and odd numbers of shuttle times do not interfere with each other, the degree of canceling or intensification, which caused by interference, becomes low. As a result, the passband has a characteristic that is flatter than an acute peak.

Figure 10:
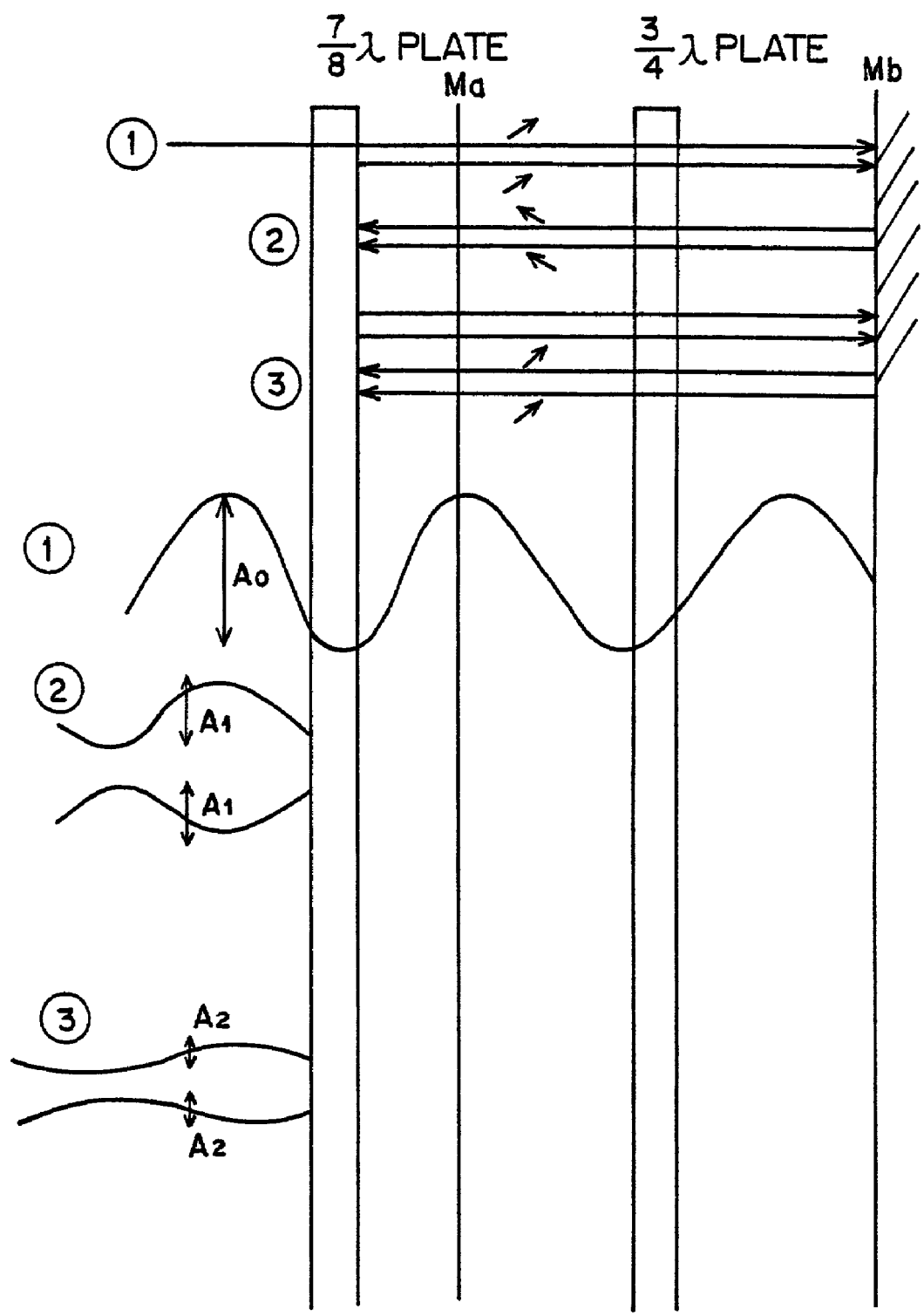
FIG. 10 conceptually explains how light is controlled by the GTR according to the preferred embodiment (No. 3)

Furthermore, as shown in FIG. 10, if a 7λ/8 plate is arranged, a phase difference occurs in different polarized waves in the case where directions, which are different from those of the polarized waves of light beams that pass through the 7λ/8 plate by even and odd numbers of shuttle times, are used as references. This exerts an influence on the manner of interference. Namely, intensification and weakening completely occur if phases completely match, and the waves interfere with each other with the same intensities, so that an acute peak characteristic is exhibited. However, if a phase shift occurs, the intensification and the weakening do not completely occur. Therefore, even a light beam having a wavelength the amplitude of which is to be 0 due to the weakening is output, since the amplitude does not become 0. Accordingly, the transmission characteristic tends to be a flat characteristic shaped like a box.

Figure 11:
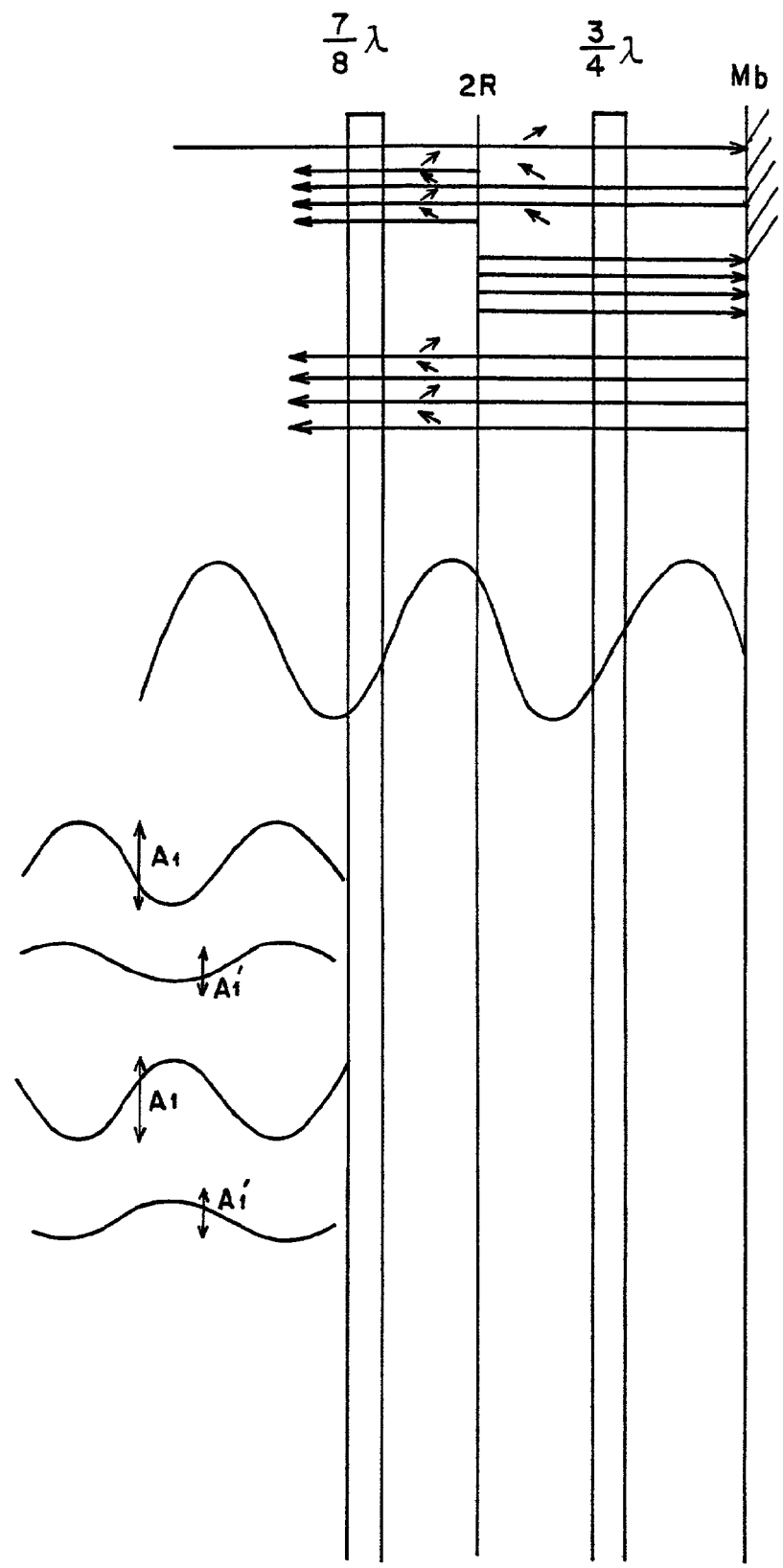
FIG. 11 conceptually explains how light is controlled by the GTR according to the preferred embodiment (No. 4)

If the mirror Ma is replaced with a 2R mirror as shown in FIG. 11, interference is controlled by using the states of different polarized waves in FIGS. 9 and 10, and the reflectances are made to differ depending on the polarized waves. As a result, the degree of interference of each of the polarized waves is adjusted as explained with reference to FIG. 8, so that complete interference is prevented. Accordingly, the transmission characteristic is further flattened.

As described above, light whose orthogonal polarized waves that do not interfere with each other, and a phase bias is applied to a different polarized wave, or a reflectance is changed, whereby a large number of independently proceeding light beams are generated within one GTR. This achieves a result equivalent to that obtained by controlling the amplitudes or phases of the light beams. Controlling the manner of interference is, after all, adjusting an output resultant from the coupling of light beams having which wavelengths by tuning the amplitudes of light beams. Accordingly, if a light beam within a certain spectrum is output without being attenuated significantly, a passband can be flattened.

Here, the phase controller shown in FIG. 7 is described. As stated earlier, the phase of light is adjusted, so that a passband can be flattened. Accordingly, the phase controller is inserted in either of paths of two light beams from the PBS, whereby a phase difference can be added to a light beam having different polarized waves, which is split by the PBS. The PBS splits light beams that are returned from the GTR, and includes two orthogonal polarized waves into the respective polarized waves, adds their amplitudes, and outputs to an output 1 or 2. As a result, interference is caused by the coupling that the PBS makes. At this time, the passband characteristic of output light can be delicately controlled by adjusting the amount of a phase bias applied by the phase controller. Namely, the phase controller is arranged to enable a delicate adjustment in the case where the characteristic of the periodical filter according to this preferred embodiment is optimized.

FIGS. 12A to 12E, and 13 show the simulation results of the periodical filter according to this preferred embodiment.

FIGS. 12A to 12E show the passband characteristic of the periodical filter according to this preferred embodiment in the case where central wavelengths are respectively 1561.42 nm, 1553.329 nm, 1545.323 nm, 1537.398 nm and 1529.55 nm in FIGS. 12A, 12B, 12C, 12D, and 12E. A vertical axis indicates dB, whereas a horizontal axis indicates THz. A solid line indicates the passband characteristic, whereas a dotted line indicates the inclination of the transmission characteristic. As shown in FIGS. 12A to 12E, two different reflectances (5% and 49%) are implemented for different polarized waves as the pass mirror of the GTR in this preferred embodiment, so that an optimization band of approximately 0.48 nm is realized with the periodical filter according to this preferred embodiment, which uses the GTR having two reflectances for different polarized waves. This is significant widening equivalent to three times a conventional optimization band of approximately 0.16 nm. If each channel has a flat transmission characteristic as describe above, a stable response with a small loss can be made despite the fluctuations caused by an external factor such as a temperature change, etc.

Figure 13:
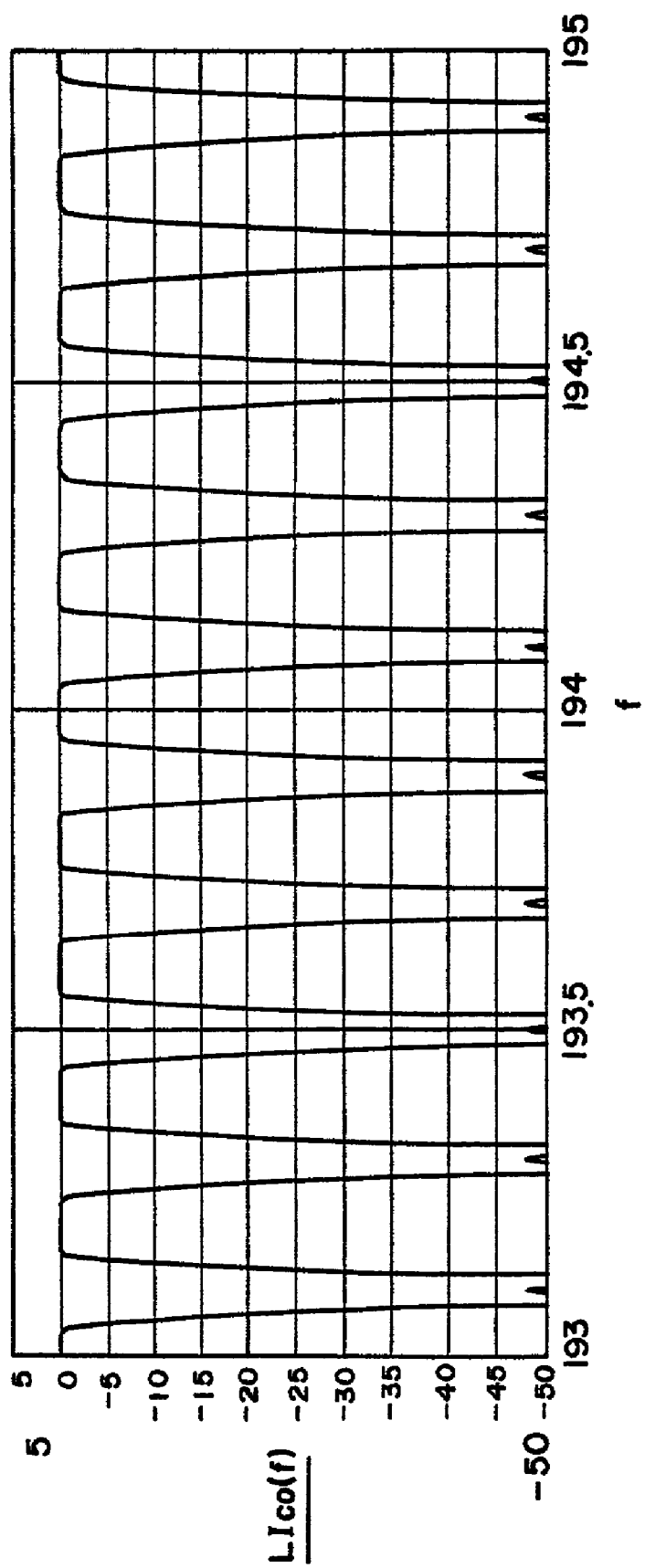
FIG. 13 shows the simulation result of the periodical filter according to the preferred embodiment (No. 2).

FIG. 13 shows the passband characteristic of the periodical filter according to this preferred embodiment in a predetermined band. A vertical axis indicates dB, whereas a horizontal axis indicates THz. As is known from this figure, 48 dB or more can be implemented as isolation in the transmission frequency characteristic (or the passband characteristic) of the periodical filter according to this preferred embodiment.

Here, the characteristics of a (single) GTR, a double GTR, a BICS, a 2R-BICS (the periodical filter according to this preferred embodiment) are summarized in the following table.

|  | Reflectance (%) | Optimization Band (nm) | Isolation (dB) |
| --- | --- | --- | --- |
| GTR | 16 | 0.4 | >33 |
| Double GTR | 8 57.2 | 0.64 | >30 |
| BICS | 17.5 | 0.16 | >43 |
| 2R-BICS | 5 49 | 0.48 | >48 |

Considering ease of control and widening of an optimization band, the periodical filter according to this preferred embodiment is the most preferable as is known from this table.

This preferred embodiment refers to the configuration of the periodical filter. However, a person having an ordinary skill in the art can easily consider that this periodical filter is available as a bandbass filter, a noise (including ASE) removal filter, and a band block filter.

Additionally, in this preferred embodiment, the reflectances which differ depending on polarized waves by the semi-transparent mirror within the GTR are described by using particular values. Actually, however, a person having an ordinary skill in the art must optimally design the reflectances.

According to the present invention, a periodical filter that can be controlled easily and whose optimization band is wide can be obtained.

What is claimed is:
1. A wavelength periodical filter, comprising:
a polarization beam splitting unit splitting input light into different polarized light beams, that each follows a different optical path;
a phase controller arranged in one of the optical paths of light beams which are split by said splitting unit
a phase bias unit having an optical axis inclined 45 degrees toward the polarized light beams of the input light; and
a resonating unit, wherein:
said resonating unit comprises a semi-transparent mirror unit having different reflectances for different polarization states, wherein the phase bias unit and the semitransparent mirror separate the polarized light beams into groups of light waves, each group comprising at least two orthogonal polarization components and polarization planes of the split polarized light beams make a +45 and −45 degrees toward the optical axis of said phase bias unit, respectively, making part of light pass through, and reflecting part of the light, a total reflection mirror unit reflecting input light 100%, and a polarized wave rotating unit, which is arranged between said semi-transparent mirror unit and said total reflection mirror unit, multiple-reflecting the polarized waves of the light between said semi-transparent mirror unit and said total reflection mirror unit while rotating the polarized waves 90 degrees each time the light shuttles between said semi-transparent mirror unit and said total reflection mirror unit; and the input light is output from said polarization beam splitting unit after being output from said resonating unit, and made to inversely travel a path.

2. The wavelength periodical filter according to claim 1, wherein a birefringent crystal having an optical axis inclined 45 degrees toward the optical axis of said phase bias unit with a reflection film on a surface to which a light beam is reflected is used as said semi-transparent mirror unit.

3. The wavelength periodical filter according to claim 1, wherein said semi-transparent mirror unit has a reflectance of 10% or less for one of the polarized waves, and a reflectance of 40% or more for the other.

4. The wavelength periodical filter according to claim 1, wherein said semi-transparent mirror unit has a reflectance of approximately 5% for one of the polarized waves, and a reflectance of approximately 49% for the other.

5. The wavelength periodical filter according to claim 1 is used as a bandpass filter, a noise removal filter removing noise (including ASE (Amplified Spontaneous Emission), or a band block filter.

6. The wavelength periodical filter according to claim 1, wherein said phase bias unit and said resonating unit are arranged in common to light beams which are split by said polarization beam splitting unit.

7. The wavelength periodical filter according to claim 1, wherein said phase bias unit is a $7\lambda/8$ plate or a $\lambda/8$ plate.

8. The wavelength periodical filter according to claim 1, wherein said polarized wave rotating unit is a $3\lambda/4$ plate or a $\lambda/4$ plate.

9. The wavelength periodical filter according to claim 1, wherein a three-dimensional photonic crystal designed to have a difference of 40% or more between polarized waves having different reflectances is used as said semi-transparent mirror unit.

10. A wavelength periodical filter, comprising:

a splitting unit splitting input light into different polarized waves which each follow a different optical path;

a phase controller arranged in one of the optical paths of the polarized waves split by said splitting unit;

a phase bias unit wherein the different polarized waves pass therethrough; and a resonating unit, having different reflectances for different polarization states, receiving the polarized waves from the phase bias unit and multiple-reflecting the polarized waves separated into groups of light waves, each group comprising at least two orthogonal components, and wherein the input light is output from the resonating unit, and returned to the splitting unit and made to inversely travel a path.

* * * * *

UNITED STATES PATENT AND TRADEMARK OFFICE
CERTIFICATE OF CORRECTION

PATENT NO. : 7,019,901 B2
APPLICATION NO. : 10/120504
DATED : March 28, 2006
INVENTOR(S) : Yuichi Kawahata It is certified that error appears in the above-identified patent and that said Letters Patent is hereby corrected as shown below:

Column 9     line 3 (claim 1), delete "semitransparent" and insert --semi-transparent--;
Column 10    line 3 (claim 5), delete "(including" and insert --including--.

Signed and Sealed this

Fourteenth Day of November, 2006

JON W. DUDAS
*Director of the United States Patent and Trademark Office*